United States Patent
Su (10) Patent No.: US 12,510,793 B2
(45) Date of Patent: Dec. 30, 2025

(54) ELECTRONIC DEVICE AND HOUSING ASSEMBLY

(71) Applicant: VIVO MOBILE COMMUNICATION CO., LTD., Dongguan (CN)

(72) Inventor: Zipeng Su, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 340 days.

(21) Appl. No.: 18/244,218

(22) Filed: Sep. 9, 2023

(65) Prior Publication Data

US 2023/0418126 A1    Dec. 28, 2023

Related U.S. Application Data

(63) Continuation of application No. PCT/CN2022/079401, filed on Mar. 4, 2022.

(30) Foreign Application Priority Data

Mar. 10, 2021 (CN) .......................... 202110260534.8

(51) Int. Cl.
  *G02F 1/153* (2006.01)
  *G02F 1/1333* (2006.01)
  *G02F 1/1345* (2006.01)
  *H01Q 1/22* (2006.01)
(52) U.S. Cl.
  CPC ...... *G02F 1/1533* (2013.01); *G02F 1/133317* (2021.01); *G02F 1/133331* (2021.01); *G02F 1/13452* (2013.01); *H01Q 1/22* (2013.01)
(58) Field of Classification Search
  None
  See application file for complete search history.

(56) References Cited

FOREIGN PATENT DOCUMENTS

| CN | 107112620 A | 8/2017 |
|---|---|---|
| CN | 108539377 A | 9/2018 |
| CN | 109348002 A | 2/2019 |
| CN | 208738416 A | 4/2019 |

(Continued)

OTHER PUBLICATIONS

International Search Report issued in corresponding International Application No. PCT/CN2022/079401, mailed May 31, 2022, 5 pages.

(Continued)

*Primary Examiner* — Richard H Kim
(74) *Attorney, Agent, or Firm* — IPX PLLC (57) ABSTRACT

An electronic device and a housing assembly are provided. The electronic device includes: a body; and a housing assembly, connected to the body, where the housing assembly includes a light-transmitting cover plate and an electrochromic assembly disposed on the light-transmitting cover plate, the electrochromic assembly includes a conductive layer and an electrochromic layer connected to the conductive layer, the conductive layer is connected to the light-transmitting cover plate, the conductive layer includes an antenna area and a conductive area, the antenna area and the conductive area are connected to each other through an isolation area, and the isolation area surrounds the antenna area. The antenna area is connected to a mainboard of the electronic device and serves as a communication antenna of the electronic device, and the electrochromic layer is connected to a power supply and changed in color in a case that the electrochromic layer is powered on.

12 Claims, 7 Drawing Sheets

(56) References Cited

FOREIGN PATENT DOCUMENTS

| CN | 110740592 A | 1/2020 |
| CN | 112014989 A | 12/2020 |
| CN | 112835238 A | 5/2021 |
| WO | 2007035568 A2 | 3/2007 |

OTHER PUBLICATIONS

First Office Action issued in related Chinese Application No. 202110260534.8, mailed Jun. 30, 2022, 4 pages.

ELECTRONIC DEVICE AND HOUSING ASSEMBLY

CROSS-REFERENCE TO RELATED APPLICATIONS

This application is a continuation of International Application No. PCT/CN2022/079401, filed on Mar. 4, 2022, which claims priority to Chinese Patent Application No. 202110260534.8, filed Mar. 10, 2021. The entire contents of each of the above-identified applications are expressly incorporated herein by reference.

TECHNICAL FIELD

This application relates to the field of electronic device technologies, and specifically, to an electronic device and a housing assembly.

BACKGROUND

Figure 1:
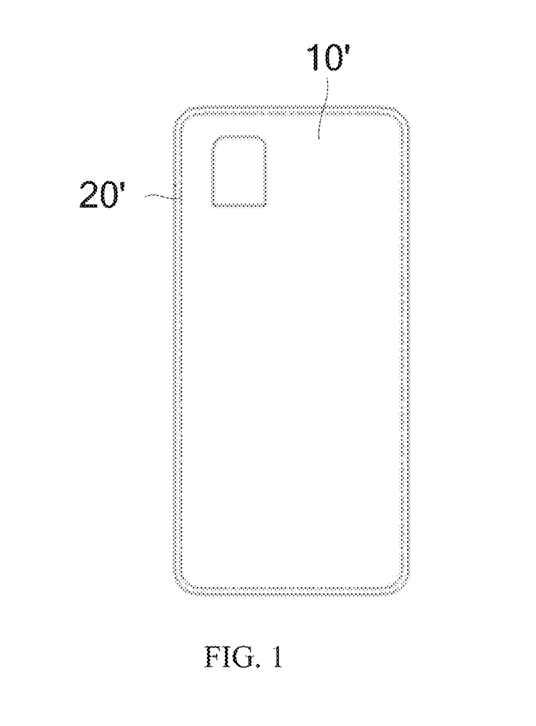
FIG. 1 is a first schematic diagram of a housing assembly in the related art.
Figure 2:
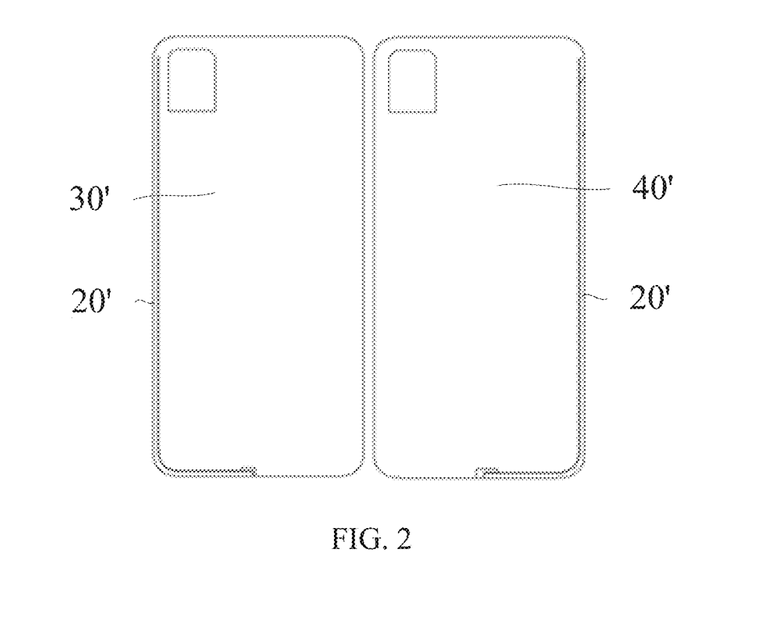
FIG. 2 is a second schematic diagram of a housing assembly in the related art.

In the related art, as shown in FIG. 1 and FIG. 2, for a housing assembly having an electrochromic assembly, the electrochromic assembly forms a color-changing area 10' and a frame area 20', and the housing assembly is changed in color through the color-changing area 10'. The electrochromic assembly is provided with an upper conductive layer 30' and a lower conductive layer 40' inside, which has a shielding effect on an antenna. Therefore, at present, it needs to reserve a specific space in the frame area 20' of the electrochromic assembly as an antenna clearance area. As a result, not only an edge cannot be changed in color, but also a width of the frame area 20' of the electrochromic assembly is increased.

SUMMARY

This application provides an electronic device and a housing assembly.

According to a first aspect, an embodiment of this application provides an electronic device, including:
a body; and
a housing assembly, connected to the body, where the housing assembly includes a light-transmitting cover plate and an electrochromic assembly disposed on the light-transmitting cover plate, the electrochromic assembly includes a conductive layer and an electrochromic layer connected to the conductive layer, the conductive layer is connected to the light-transmitting cover plate, the conductive layer includes an antenna area and a conductive area, the antenna area and the conductive area are connected to each other through an isolation area, and the isolation area surrounds the antenna area.

The antenna area is connected to a mainboard of the electronic device and serves as a communication antenna of the electronic device, and the electrochromic layer is connected to a power supply and changed in color in a case that the electrochromic layer is powered on.

According to a second aspect, an embodiment of this application provides a housing assembly, applied to an electronic device, where the housing assembly includes:
a light-transmitting cover plate; and
an electrochromic assembly, disposed on the light-transmitting cover plate, where the electrochromic assembly includes a conductive layer and an electrochromic layer connected to the conductive layer, the conductive layer is connected to the light-transmitting cover plate, the conductive layer includes an antenna area and a conductive area, the antenna area and the conductive area are connected to each other through an isolation area, and the isolation area surrounds the antenna area. The antenna area is connected to a mainboard of the electronic device and serves as a communication antenna of the electronic device, and the electrochromic layer is connected to a power supply through the conductive area and changed in color in a case that the electrochromic layer is powered on.

In this embodiment of this application, the electronic device includes the body and the housing assembly. The housing assembly includes the light-transmitting cover plate and the electrochromic assembly. The electrochromic assembly includes the conductive layer and the electrochromic layer, and the conductive layer includes the antenna area and the conductive area. The conductive area is connected to the electrochromic layer, so that the electrochromic layer is connected to the power supply, and then a color-changing function of the electrochromic layer is implemented in a case that the electrochromic layer is powered on, so that a color of the housing assembly can be adjusted according to a user requirement. The antenna area is disposed on the conductive layer, and the antenna area is used for etching an antenna pattern, so that the antenna area is used as the communication antenna. To be specific, the communication antenna is integrated on the conductive layer, and therefore there is no need to reserve an installation area of the communication antenna at an edge of the electrochromic assembly, thereby reducing a size of an edge area of the electrochromic assembly, that is, reducing a size of a frame that cannot be changed in color and that is of the electrochromic assembly, increasing a color-changing range of the housing assembly, and improving appearance aesthetics of the housing assembly. In addition, the isolation area is arranged around the antenna area to isolate the conductive area from the antenna area, so that the antenna area is not shielded by the electrochromic assembly, thereby ensuring reliability of the antenna area. That is, the antenna area is integrated on the conductive layer, and the antenna area is isolated from the conductive area through the isolation area, which saves space occupied by the communication antenna and increases the color-changing range of the housing assembly.

BRIEF DESCRIPTION OF DRAWINGS

The foregoing and/or additional aspects and advantages of this application will become apparent and readily understandable from the descriptions of the embodiments with reference to the following accompanying drawings.

DETAILED DESCRIPTION

The following describes in detail embodiments of this application. Examples of the embodiments are illustrated in the accompanying drawings. Reference numerals which are the same or similar throughout the accompanying drawings represent identical or similar elements or elements having identical or similar functions. The embodiments described below with reference to the accompanying drawings are exemplary and only used to explain this application, and cannot be understood as a limitation on this application. All other embodiments obtained by a person of ordinary skill in the art based on the embodiments of this application without creative efforts shall fall within the protection scope of this application.

Features of the terms "first" and "second" in the specification and claims of this application may explicitly or implicitly include one or more such features. In the descriptions of this application, unless otherwise specified, "a plurality of" means two or more.

In the descriptions of this application, it should be understood that the orientations or positional relationships indicated by the terms "upper," "lower," "top," "bottom," "inside," "outside," "circumferential," and the like are based on the orientations or positional relationships shown in the accompanying drawings. These terms are merely for ease and brevity of description of this application rather than indicating or implying that the apparatuses or elements mentioned must have specific orientations or must be constructed or manipulated according to specific orientations, and therefore shall not be construed as any limitations on this application.

In the descriptions of the embodiments of this application, unless otherwise specified and defined explicitly, the terms "mount," "connect," and "join" should be understood in their general senses. For example, they may refer to a fixed connection, a detachable connection, or an integral connection, may refer to a mechanical connection or an electrical connection, and may refer to a direct connection, an indirect connection via an intermediate medium, or an internal communication between two elements. A person of ordinary skill in the art can understand specific meanings of these terms in this application as appropriate to specific situations.

The following describes an electronic device and a housing assembly in the embodiments of this application with reference to FIG. 3 to FIG. 12.

The electronic device in some embodiments of this application includes a body; and a housing assembly, connected to the body, where the housing assembly includes a light-transmitting cover plate 1 and an electrochromic assembly 2 disposed on the light-transmitting cover plate 1, the electrochromic assembly 2 includes a conductive layer 20 and an electrochromic layer 21 connected to the conductive layer 20, the conductive layer 20 is connected to the light-transmitting cover plate 1, the conductive layer 20 includes an antenna area 202 and a conductive area 204, the antenna area 202 and the conductive area 204 are connected to each other through an isolation area 206, and the isolation area 206 surrounds the antenna area 202. The antenna area 202 is connected to a mainboard of the electronic device and serves as a communication antenna of the electronic device, and the electrochromic layer 21 is connected to a power supply through the conductive area 204 and changed in color in a case that the electrochromic layer 21 is powered on.

Figure 3:
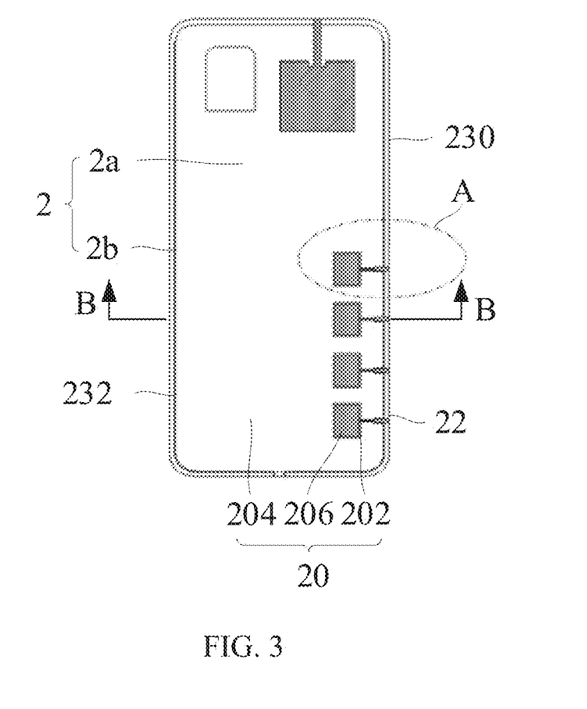
FIG. 3 is a first schematic diagram of an electronic device according to an embodiment of this application.
Figure 4:
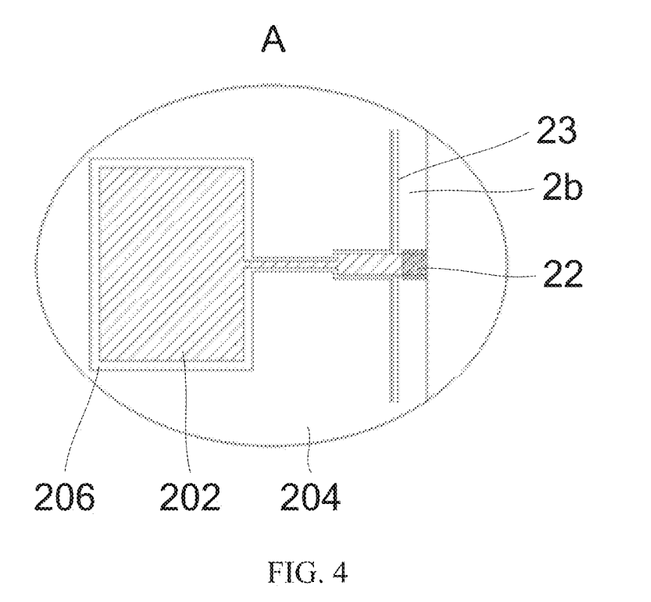
FIG. 4 is an enlarged schematic diagram of zone A in FIG. 3.
Figure 10:
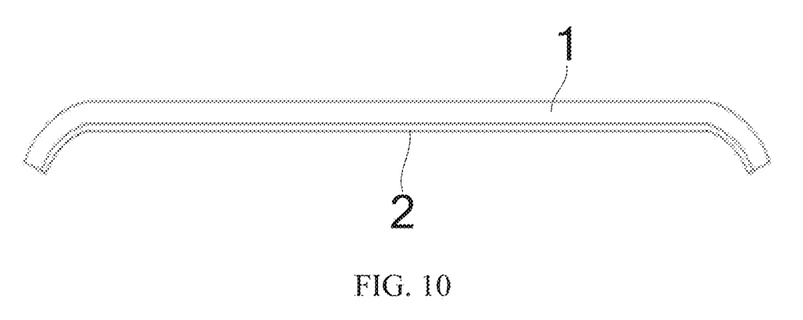
FIG. 10 is a first schematic diagram of a housing assembly according to an embodiment of this application.

As shown in FIG. 3, FIG. 4, and FIG. 10, the electronic device in the embodiments of this application includes the body and the housing assembly. The housing assembly includes the light-transmitting cover plate 1 and the electrochromic assembly 2. The electrochromic assembly 2 includes the conductive layer 20 and the electrochromic layer 21, and the conductive layer 20 includes the antenna area 202 and the conductive area 204. The conductive area 204 is connected to the electrochromic layer 21, so that the electrochromic layer 21 is connected to the power supply, and then a color-changing function of the electrochromic layer 21 is implemented in a case that the electrochromic layer 21 is powered on, so that a color of the housing assembly can be adjusted according to a user requirement. The antenna area 202 is disposed on the conductive layer 20, and the antenna area 202 is used for etching an antenna pattern, so that the antenna area 202 is used as the communication antenna. To be specific, the communication antenna is integrated on the conductive layer 20, and therefore there is no need to reserve an installation area of the communication antenna at an edge of the electrochromic assembly 2, thereby reducing a size of an edge area of the electrochromic assembly 2, that is, reducing a size of a frame that cannot be changed in color and that is of the electrochromic assembly 2, increasing a color-changing range of the housing assembly, and improving appearance aesthetics of the electronic device. In addition, the isolation area 206 is arranged around the antenna area 202 to isolate the conductive area 204 from the antenna area 202, so that the antenna area 202 is not shielded by the electrochromic assembly 2, thereby ensuring reliability of the antenna area 202. That is, the antenna area 202 is integrated on the conductive layer 20, and the antenna area 202 is isolated from the conductive area 204 through the isolation area 206, which saves space occupied by the communication antenna and increases the color-changing range of the housing assembly.

It can be understood that the light-transmitting cover plate 1 can transmit light, and the light-transmitting cover plate 1 can further transmit a changed color of the electrochromic layer 21, so that the light-transmitting cover plate 1 shows different colors. Specifically, the light-transmitting cover plate 1 is a glass cover plate or a resin plastic cover plate.

In some implementations, a size of the electrochromic assembly 2 is the same as that of the light-transmitting cover plate 1, so that the light-transmitting cover plate 1 completely covers the electrochromic assembly 2. In some implementations, the size of the electrochromic assembly 2 is larger than that of the light-transmitting cover plate 1, so that the light-transmitting cover plate 1 covers at least an area in which the electrochromic layer 21 is located. In some implementations, the size of the electrochromic assembly 2 may be designed to be smaller than that of the light-transmitting cover plate 1.

In some implementations, there are a plurality of antenna areas 202.

As shown in FIG. 3, according to some embodiments of this application, the electrochromic assembly 2 further includes a first wiring portion 22, connected to the antenna area 202 for connecting to the mainboard; and a second wiring portion 23, connected to the conductive area 204 for connecting to the power supply, where the electrochromic assembly includes a frame area 2b and a color-changing area 2a, the frame area 2b surrounds the color-changing area 2a, the antenna area 202 and the conductive area 204 are located in the color-changing area 2a, and the first wiring portion 22 and the second wiring portion 23 are disposed in the frame area 2b.

In this embodiment, the electrochromic assembly 2 further includes the first wiring portion 22 and the second wiring portion 23. The first wiring portion 22 is connected to the antenna area 202 for connecting to the mainboard, so that the antenna area 202 is used as the communication antenna of the electronic device. The second wiring portion 23 is connected to the conductive area 204 for connecting to the power supply, so that the color-changing function is implemented in a case that the electrochromic layer 21 is powered on. The electrochromic assembly 2 includes the color-changing area 2a and the frame area 2b, and the first wiring portion 22 and the second wiring portion 23 are disposed in the frame area 2b, that is, the frame area 2b can be used for wiring, so that the electrochromic layer 21 can be connected to the power supply to implement the color-changing function of the electrochromic layer 21, and the antenna area 202 can be connected to the mainboard to implement a signal sending and receiving function of the antenna area 202. The antenna area 202 and the conductive area 204 are located in the color-changing area 2a, that is, the antenna area 202 does not occupy space of the frame area 2b, and space may be reserved only in the frame area 2b for placing the first wiring portion 22 and the second wiring portion 23, thereby reducing a size of the frame area 2b.

Figure 7:
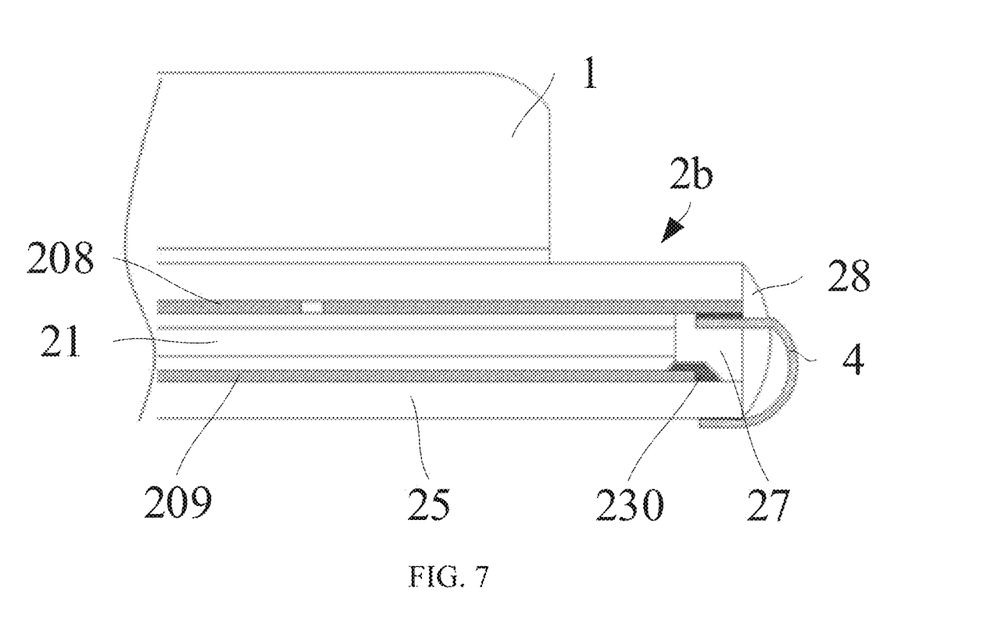
FIG. 7 is a third schematic diagram of an electronic device according to an embodiment of this application.
Figure 8:
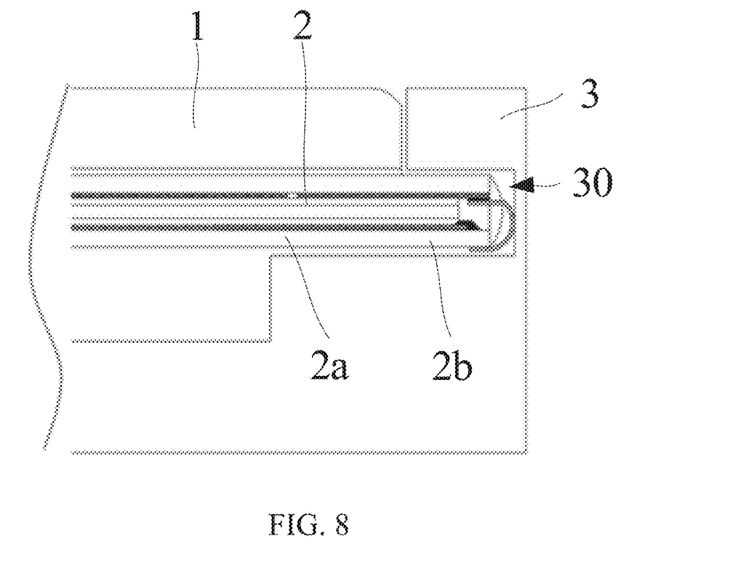
FIG. 8 is a fourth schematic diagram of an electronic device according to an embodiment of this application.

As shown in FIG. 7 and FIG. 8, according to some embodiments of this application, the electronic device further includes a middle frame 3, where the light-transmitting cover plate 1 is disposed on the middle frame 3, the middle frame 3 is provided with a groove 30, along a circumferential direction of the light-transmitting cover plate 1, at least part of the frame area 2b protrudes from the light-transmitting cover plate 1, and the frame area 2b is disposed in the groove 30.

In this embodiment, the electronic device further includes the middle frame 3. The light-transmitting cover plate 1 is disposed on the middle frame 3, and the middle frame 3 supports the light-transmitting cover plate 1. Because the first wiring portion 22 and the second wiring portion 23 are installed in the frame area 2b, the color-changing function cannot be implemented in the frame area 2b. Therefore, the middle frame 3 is provided with the groove 30, and along the circumferential direction of the light-transmitting cover plate 1, at least part of the frame area 2b is designed to protrude from the light-transmitting cover plate 1. To be specific, the frame area 2b expands outward, so that the part of the frame area 2b protruding from the light-transmitting cover plate 1 extends into the groove 30, and at least part of the frame area 2b is blocked by the middle frame 3, which reduces an area covered by the light-transmitting cover plate 1 on the frame area 2b, that is, increasing an area covered by the light-transmitting cover plate 1 on the color-changing area 2a, thereby increasing an area of the color-changing area 2a of the electronic device.

In some implementations, along the circumferential direction of the light-transmitting cover plate 1, the frame area 2b protrudes from the light-transmitting cover plate 1 and extends into the groove 30 of the middle frame 3, so that the light-transmitting cover plate 1 covers the color-changing area 2a, implementing color changing of an entire surface of light-transmitting cover plate 1.

Further, the middle frame 3 and the light-transmitting cover plate 1 enclose an installation space, and the electrochromic assembly 2 is disposed in the installation space, that is, disposed on a side of the light-transmitting cover plate 1 facing inside of the electronic device.

Figure 9:
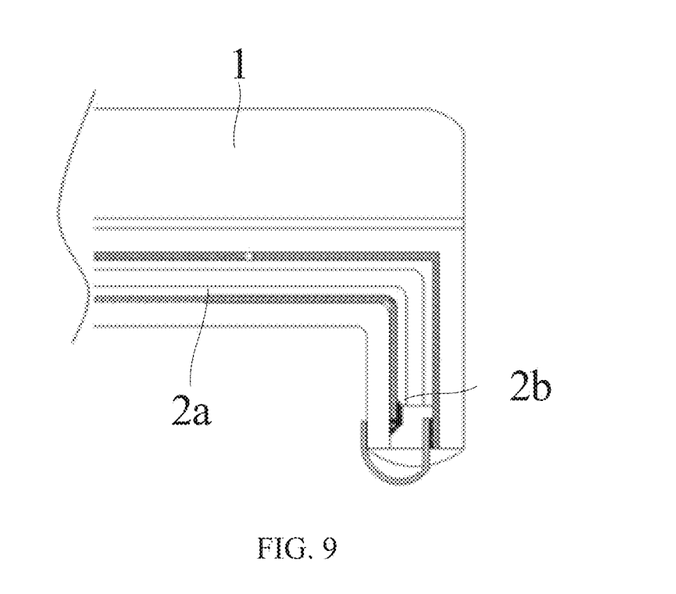
FIG. 9 is a fifth schematic diagram of an electronic device according to an embodiment of this application.
Figure 11:
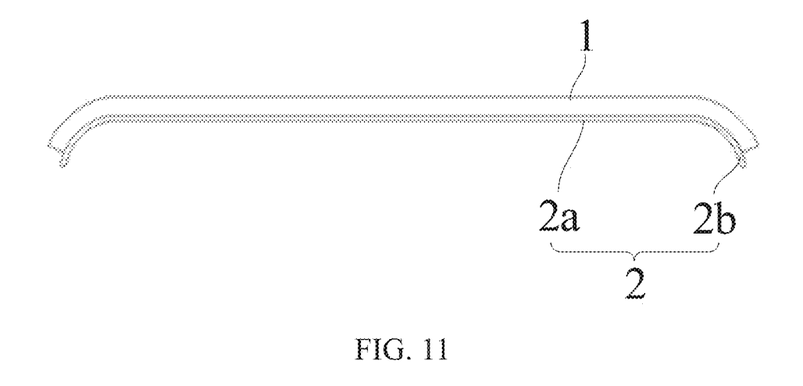
FIG. 11 is a second schematic diagram of a housing assembly according to an embodiment of this application.
Figure 12:
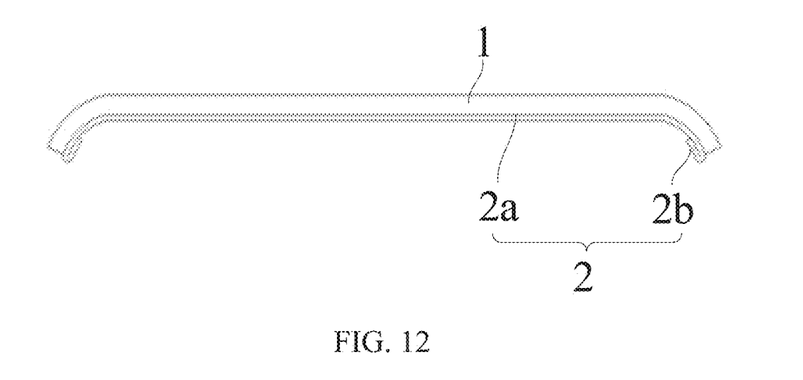
FIG. 12 is a third schematic diagram of a housing assembly according to an embodiment of this application.

As shown in FIG. 9, FIG. 11, and FIG. 12, according to some embodiments of this application, at least part of the electrochromic assembly 2 is of a flexible structure, and along a circumferential direction of the light-transmitting cover plate 1, at least part of the frame area 2b is folded and arranged on a side of the color-changing area 2a facing away from the light-transmitting cover plate 1, so that the light-transmitting cover plate 1 covers the color-changing area 2a.

In this embodiment, because the first wiring portion 22 and the second wiring portion 23 are installed in the frame area 2b, the color-changing function cannot be implemented in the frame area 2b. Therefore, at least part of the electrochromic assembly 2 is designed as a flexible component, to enable the frame area 2b to be bent at least, that is, the frame area 2b that cannot be changed in color is bent to a side facing away from the light-transmitting cover plate 1, which reduces an area covered by the light-transmitting cover plate 1 on the frame area 2b, that is, increasing an area covered by the light-transmitting cover plate 1 on the color-changing area 2a, thereby increasing an area of the color-changing area 2a of the electronic device.

In some implementations, the electrochromic assembly 2 is of the flexible structure, and any part of the electrochromic assembly 2 can be bent. Further, the frame area 2b is folded on the side of the color-changing area 2a facing away from the light-transmitting cover plate 1, so that the light-transmitting cover plate 1 completely covers the color-changing area 2a, thereby implementing a color-changing function of an entire surface of the electronic device.

Figure 5:
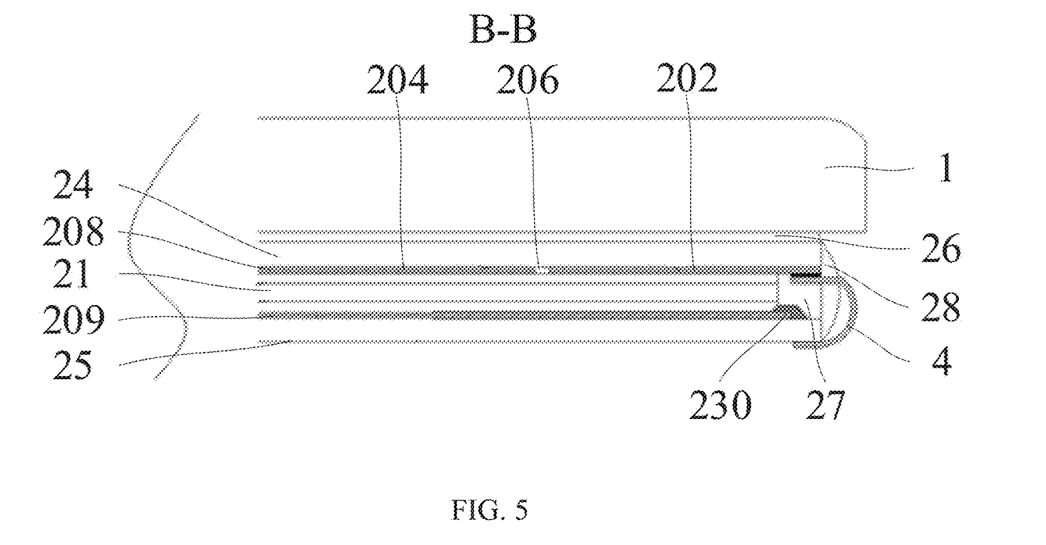
FIG. 5 is a part of a cross-sectional view at zone B-B in FIG. 3.
Figure 6:
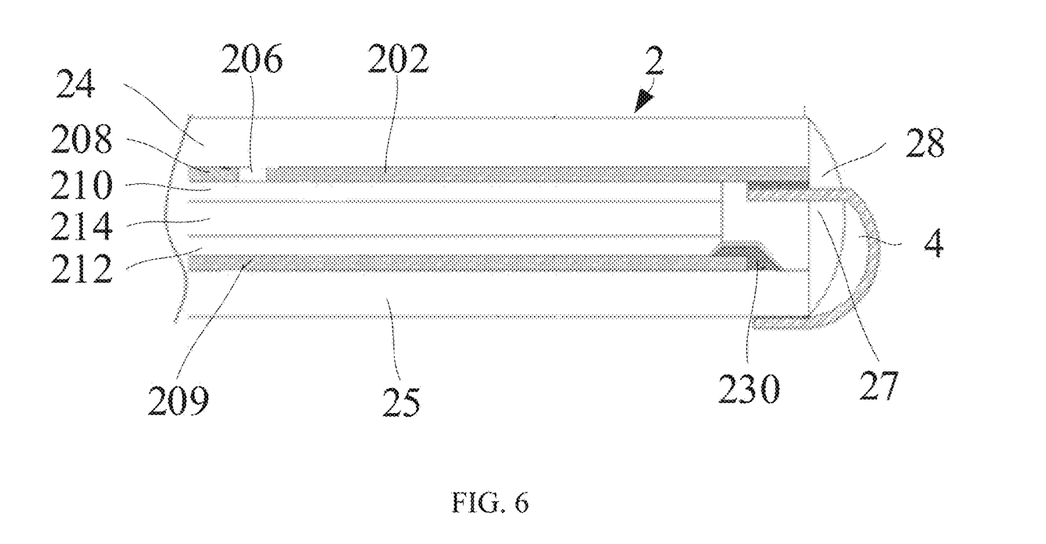
FIG. 6 is a second schematic diagram of an electronic device according to an embodiment of this application.

As shown in FIG. 5 and FIG. 6, according to some embodiments of this application, the conductive layer 20 includes a first conductive layer 208, connected to the light-transmitting cover plate 1, where the first conductive layer 208 includes the antenna area 202, the conductive area 204, and the isolation area 206; and a second conductive layer 209, disposed opposite the first conductive layer 208, where the electrochromic layer 21 is disposed between the first conductive layer 208 and the second conductive layer 209.

In this embodiment, the conductive layer 20 includes the first conductive layer 208 and the second conductive layer 209. The first conductive layer 208 is disposed opposite the second conductive layer 209, and the electrochromic layer 21 is connected to positive and negative electrodes of the power supply through the first conductive layer 208 and the second conductive layer 209, thereby implementing the color-changing function of the electrochromic layer 21. The first conductive layer 208 includes the antenna area 202, the conductive area 204, and the isolation area 206, that is, the first conductive layer 208 is provided with the antenna area 202, the conductive area 204, and the isolation area 206. The isolation area 206 can isolate the conductive area 204 from the antenna area 202. In this way, connection between the electrochromic layer 21 and the power supply can be implemented through the conductive area 204 and the second wiring portion 23, and reduction of the frame area 2b can be implemented by integrating the antenna area 202 on the first conductive layer 208. In addition, the second conductive layer 209 may further serve as a reflective layer of the antenna area 202 to enhance a signal of an antenna in the antenna area 202.

In some implementations, the first conductive layer 208 and the second conductive layer 209 may be metal grids (such as nano-silver), metal oxides (such as indium tin oxides), or the like having a conductive function. The first conductive layer 208 and the second conductive layer 209 all have a specific transmittance, so that a color can be transmitted, thereby implemented changeability of a color of the housing assembly.

In the first conductive layer 208, materials of the conductive area 204 and the antenna area 202 may be the same or different. The isolation area 206 is an etched and removed part of the first conductive layer 208, to isolate the conductive area 204 from the antenna area 202.

As shown in FIG. 3, according to some embodiments of this application, the second wiring portion 23 includes a first conductive wire 230, connected to the conductive area 204, where the first conductive wire 230 is disposed in the frame area 2b; and a second conductive wire 232, connected to the second conductive layer 209, where the second conductive wire 232 is disposed in the frame area 2b.

In this embodiment, the second wiring portion 23 includes the first conductive wire 230 and the second conductive wire 232. The first conductive wire 230 is disposed on the first conductive layer 208 for connecting to the conductive area 204, the second conductive wire 232 is disposed on the second conductive layer 209, and the first conductive wire 230 and the second conductive wire 232 are disposed in the frame area 2b.

Further, the first conductive wire 230 is disposed opposite the second conductive wire 232 to avoid an increase of a width of the frame area 2b on a side of the electronic device in a case that the first conductive wire 230 and the second conductive wire 232 are disposed on a same side, which affects aesthetics of the electronic device.

In some implementations, the first conductive wire 230 and the second conductive wire 232 are disposed close to an edge of the electrochromic assembly 2. Further, the first conductive wire 230 and the second conductive wire 232 may be metals such as silver and copper or other conductive substances.

As shown in FIG. 5, according to some embodiments of this application, the electrochromic assembly 2 further includes a first substrate 24, where the first substrate 24 is connected to the light-transmitting cover plate 1, and the first substrate 24 is located between the light-transmitting cover plate 1 and the first conductive layer 208; and a second substrate 25, where the second substrate 25 is connected to the second conductive layer 209 and is located on a side of the second conductive layer 209 facing away from the first conductive layer 208.

In this embodiment, the electrochromic assembly 2 includes the first substrate 24 and the second substrate 25. The first substrate 24 is disposed opposite the second substrate 25, the electrochromic layer 21 and the conductive layer 20 are disposed between the first substrate 24 and the second substrate 25, and the electrochromic layer 21 and the conductive layer 20 are connected to each other through the first substrate 24 and the second substrate 25, to form the electrochromic assembly 2. In addition, the first substrate 24 and the second substrate 25 can further protect the electrochromic layer 21 and the conductive layer 20.

In some implementations, both the first substrate 24 and the second substrate 25 are light-transmitting substrates. Specifically, the first substrate 24 and the second substrate 25 may be glass substrates or resin plastic substrates.

As shown in FIG. 5, according to some embodiments of this application, the electrochromic assembly 2 further includes an adhesive member 26, where the first substrate 24 is connected to the light-transmitting cover plate 1 by using the adhesive member 26.

In this embodiment, the electrochromic assembly 2 includes the adhesive member 26, and the adhesive member 26 connects the light-transmitting cover plate 1 and the first substrate 24, ensuring connection reliability between the electrochromic assembly 2 and the light-transmitting cover plate 1.

According to some embodiments of this application, the first substrate 24 includes any one of a resin substrate and a glass substrate; the second substrate 25 includes any one of a resin substrate and a glass substrate; and the adhesive member includes an optically clear adhesive.

In this embodiment, the first substrate 24 and the second substrate 25 are light-transmitting substrates, where the first substrate 24 and the second substrate 25 may be any one of resin substrates and glass substrates, improving light transmittance and reducing production costs. The adhesive member 26 is the optically clear adhesive, thereby improving light transmittance performance of the adhesive member 26.

As shown in FIG. 5 and FIG. 6, according to some embodiments of this application, the electrochromic assembly 2 further includes a first sealant 27, where an outer edge of the electrochromic layer 21 is sealed by the first sealant 27, and the first sealant 27 serves as an inner sealant for connecting the electrochromic layer 21 as a whole and for waterproofing; and a second sealant 28, where an outer edge of the electrochromic assembly is sealed by the second sealant 28, and the second sealant 28 serves as an outer sealant for connecting the electrochromic assembly as a whole and for waterproofing.

Further, both the first sealant 27 and the second sealant 28 are located in the frame area 2b, to avoid an influence on color changing of the electrochromic layer 21.

As shown in FIG. 5 and FIG. 6, according to some embodiments of this application, the electronic device further includes a circuit board 4, where the circuit board is bent and arranged on a side of the first conductive layer facing away from the light-transmitting cover plate, an end of the circuit board is connected to the first wiring portion, and another end of the circuit board is connected to the mainboard.

In this embodiment, the electronic device further includes the circuit board 4. The circuit board 4 is bent and arranged, thereby reducing space occupied by the circuit board 4 and avoiding the influence on the color changing of the electrochromic layer 21. In addition, the end of the circuit board 4 is connected to the first wiring portion, and the another end is connected to the mainboard, implementing a communication function of the antenna area 202.

In some implementations, the circuit board 4 is a flexible circuit board.

As shown in FIG. 6, according to some embodiments of this application, the electrochromic layer 21 includes an electrochromic material layer 210, where the electrochromic material layer 210 is disposed close to the light-transmitting cover plate 1; an ion storage layer 212, where the ion storage layer 212 is located on a side of the electrochromic material layer 210 facing away from the light-transmitting cover plate 1; and an electrolyte layer 214, where the electrolyte layer 214 is located between the electrochromic material layer 210 and the ion storage layer 212.

In this embodiment, the electrochromic layer 21 includes the electrochromic material layer 210 and the ion storage layer 212 and the electrolyte layer 214 that are arranged on two sides of the electrochromic material layer 210. A color-changing function of the electrochromic assembly 2 is implemented by a joint action of the electrochromic material layer 210, the storage layer, the electrolyte layer 214, and the conductive layer 20.

Some embodiments of this application provide the housing assembly, applied to the electronic device. The housing assembly includes the light-transmitting cover plate 1; and the electrochromic assembly 2, disposed on the light-transmitting cover plate 1, where the electrochromic assembly 2 includes the conductive layer 20 and the electrochromic layer 21 connected to the conductive layer 20. The conductive layer 20 is connected to the light-transmitting cover plate 1, the conductive layer 20 includes the antenna area 202 and the conductive area 204, the antenna area 202 and the conductive area 204 are connected to each other through an isolation area 206, and the isolation area 206 surrounds the antenna area 202. The antenna area 202 is connected to the mainboard of the electronic device and serves as the communication antenna of the electronic device, and the electrochromic layer 21 is connected to the power supply through the conductive area 204 and changed in color in a case that the electrochromic layer 21 is powered on.

The housing assembly in the embodiments of this application includes the light-transmitting cover plate 1 and the electrochromic assembly 2. The electrochromic assembly 2 includes the conductive layer 20 and the electrochromic layer 21, and the conductive layer 20 includes the antenna area 202 and the conductive area 204. The conductive area 204 is connected to the electrochromic layer 21, so that the electrochromic layer 21 is connected to the power supply, and then a color-changing function of the electrochromic layer 21 is implemented in a case that the electrochromic layer 21 is powered on, so that a color of the housing assembly can be adjusted according to a user requirement. The antenna area 202 is disposed on the conductive layer 20, and the antenna area 202 is used for etching an antenna pattern, so that the antenna area 202 is used as the communication antenna. In some implementations, the communication antenna is integrated on the conductive layer 20, and therefore there is no need to reserve an installation area of the communication antenna at an edge of the electrochromic assembly 2, thereby reducing a size of an edge area of the electrochromic assembly 2, that is, reducing a size of a frame that cannot be changed in color and that is of the electrochromic assembly 2, increasing a color-changing range of the housing assembly, and improving appearance aesthetics of the electronic device. In addition, the isolation area 206 is arranged around the antenna area 202 to isolate the conductive area 204 from the antenna area 202, so that the antenna area 202 is not shielded by the electrochromic assembly 2, thereby ensuring reliability of the antenna area 202. That is, the antenna area 202 is integrated on the conductive layer 20, and the antenna area 202 is isolated from the conductive area 204 through the isolation area 206, which saves space occupied by the communication antenna and increases the color-changing range of the housing assembly.

Further, the housing assembly in this embodiment includes the housing assembly in the electronic device of any one of the embodiments of the first aspect, and therefore includes all beneficial effects of the housing assembly in the electronic device of any one of the embodiments of the first aspect, which is not described herein again.

In some implementations, as shown in FIG. 5, the housing assembly includes the light-transmitting cover plate 1 and the electrochromic assembly 2. The electrochromic assembly 2 includes the conductive layer 20 and the electrochromic layer 21, part of the conductive layer 20 is designed as an antenna, and various antenna patterns may be designed according to requirements. The conductive layer 20 is further provided with the isolation area 206 and the conductive area 204, the isolation area 206 is an etched and removed part on the conductive layer 20, and the isolation area 206 surrounds the antenna area 202.

Further, as shown in FIG. 3, the electrochromic assembly 2 further includes the first wiring portion 22, the second wiring portion 23, the first substrate 24, the second substrate 25, and the adhesive member 26. The conductive layer 20 includes the first conductive layer 208 and the second conductive layer 209, and the conductive area 204, the isolation layer, and the antenna area 202 are disposed on the first conductive layer 208. The light-transmitting cover plate 1 is made of a glass, a resin plastic, or other materials. The adhesive member 26 is an optical double-sided adhesive tape, i.e., an Optically Clear Adhesive (OCA). The first substrate 24 and the second substrate 25 may be made of glasses, resin plastics, or other materials. The first conductive layer 208 may be a metal grid such as nano-silver, a metal oxide such as an indium tin oxide ITO, or the like having a conductive function. All such materials have a specific transmittance, and can transmit a color. A material of the antenna area 202 is the same as that of the conductive area 204, and parts of the antenna area 202 and the conductive area 204 may also be separately made of different materials according to requirements. The electrochromic layer 21 may include the electrochromic material layer 210, the electrolyte layer 214, and the ion storage layer 212. In this application, such structures are used as examples, and no limitation is imposed on the electrochromic layer 21 having another structure. The second wiring portion 23 includes the first conductive wire 230 and the second conductive wire 232, and the first conductive wire 230 and the second conductive wire 232 may be metals such as silver and copper or other conductive substances. The second conductive layer 209 may further serve as a reflective layer of an antenna in the antenna area 202 to enhance a signal of the antenna.

Further, as shown in FIG. 6, the first sealant 27 serves as an inner edge sealant, and the second sealant 28 serves as an outer edge sealant. The first wiring portion 22 is a wiring-pin layer of the signal of the antenna, which is connected to the circuit board 4 to implement transmission of the signal of the antenna to the mainboard.

According to the foregoing solution, the frame area 2b of the housing assembly can be reduced, and there is no need to reserve an antenna clearance area.

Further, as shown in FIG. 7 and FIG. 8, part of the frame area 2b of the electrochromic assembly 2 expands outward, and the frame area 2b extends into the groove 30 inside the middle frame 3 of the electronic device, implementing color changing of an entire surface of the housing assembly.

Further, as shown in FIG. 9, FIG. 11, and FIG. 12, the first substrate 24 and the second substrate 25 are made of resin plastic-like foldable materials, which can be designed to be bent and folded. Specifically, part of the frame area 2b may be folded to the back, achieving a frameless electrochromic effect.

As shown in FIG. 10 to FIG. 12, the foregoing design can also be performed on the three-dimensional housing assembly. As shown in FIG. 10, the electrochromic assembly 2 is flush with the light-transmitting cover plate 1. As shown in FIG. 11, the electrochromic assembly 2 expands outward. As shown in FIG. 12, the electrochromic assembly 2 is designed to be folded.

A 4 Multi Input Multi Output (MIMO) antenna is used as an example in the foregoing figures, and another antenna with a similar pattern may also be used, such as a Near Field Communication (NFC) antenna, a wireless charging antenna, a Wireless Fidelity wireless connection (WiFi) antenna, a Bluetooth antenna, and communication antennas of various generations. All such antennas as shown in following table 1 may be integrated on an electrochromic substrate.

TABLE 1

| | Frequency band (around) Ghz | Wavelength (cm) | Antenna (¼ wavelength) cm |
|---|---|---|---|
| 2G | 0.8 to 1, 1.8 | 20 to 30 | 5 to 7.5 |
| 3G | 1.8 to 2.2 | 13 to 16 | 3 to 5 |
| 4G | 1.8 to 2.7 | 11 to 16 | 2.5 to 4 |
| 5G | Low frequency 3 to 5 | 6 to 10 | 1.5 to 2.5 |
|  | High frequency 20 to 30 | 10 | 2.5 |
| wifi | 2.4 | 12.5 | 3 |
|  | 5 | 6 | 1.5 |
| Bluetooth | 2.4 | 12.5 | 3 |
| GPS/Beidou | 1.2 to 1.6 | 18 to 25 | 4.5 to 6 |
| NFC | 2.4 | 12.5 | 3 |
|  | 13.56 | 22 | Near-field transmission, |
| Wireless charging | 13.56 | 22 | coil electric |
|  | 22 | / | field coupling |

This application discloses the design of the housing assembly having the electrochromic assembly 2, and the communication antenna of the electronic device is designed inside the electrochromic assembly 2 of the electronic device to reduce antenna components. In addition, the communication antenna is integrated on the electrochromic assembly 2 to save space, and the communication antenna is not shielded by the electrochromic assembly 2, reducing the frame area 2b. In addition, the foldable electrochromic assembly 2 that expands outward is disclosed. Part of the frame area 2b of the electrochromic assembly 2 is designed inside the middle frame 3 of the entire electronic device or to be folded to the back, implementing color changing of an entire surface of the light-transmitting cover plate 1, having no reserved area in a frame, and implementing an ultimate appearance.

The electronic device may be a terminal, or another device other than the terminal. For example, the electronic device may be a mobile phone, a tablet computer, a notebook computer, a palmtop computer, an in-vehicle electronic device, a Mobile Internet Device (MID), an Augmented Reality (AR)/Virtual Reality (VR) device, a robot, a wearable device, an Ultra-Mobile Personal Computer (UMPC), a netbook, a Personal Digital Assistant (PDA), or the like. The electronic device may alternatively be a server, a Network Attached Storage (NAS), a personal computer, a television, a teller machine, a self-service machine, or the like. This is not specifically limited in the embodiments of this application.

In the description of this specification, the description with reference to the terms such as "an embodiment," "some embodiments," "an illustrative embodiment," "an example," "a specific example," or "some examples" means that a specific feature, a structure, a material, or a characteristic described with reference to the embodiment or example is included in at least one embodiment or example of this application. In this specification, illustrative expressions of the foregoing terms do not necessarily refer to the same embodiment or example. Moreover, the specific feature, structure, material, or characteristic described may be combined in a proper way in any one or more embodiments or examples.

Although the embodiments of this application have been shown and described, a person of ordinary skill in the art can understand that various changes, modifications, replacements, and variants may be made to these embodiments without departing from the principle and purpose of this application, and the scope of this application is limited by the claims and their equivalents.

The invention claimed is:

1. An electronic device, comprising:
a body; and
a housing assembly, connected to the body,
wherein the housing assembly comprises: a light-transmitting cover plate and an electrochromic assembly disposed on the light-transmitting cover plate,
wherein the electrochromic assembly comprises: a conductive layer and an electrochromic layer connected to the conductive layer,
wherein the conductive layer is connected to the light-transmitting cover plate,
wherein the conductive layer comprises: an antenna area and a conductive area,
wherein the antenna area and the conductive area are connected to each other through an isolation area, and the isolation area surrounds the antenna area,
wherein the antenna area is connected to a mainboard of the electronic device and serves as a communication antenna of the electronic device, and
wherein the electrochromic layer is connected to a power supply through the conductive area and changed in color when the electrochromic layer is powered on.

2. The electronic device according to claim 1, wherein the electrochromic assembly further comprises:
a first wiring portion, connected to the antenna area for connecting to the mainboard; and
a second wiring portion, connected to the conductive area for connecting to the power supply,
wherein the electrochromic assembly comprises: a frame area and a color-changing area,
wherein the frame area surrounds the color-changing area,
wherein the antenna area and the conductive area are located in the color-changing area, and
wherein the first wiring portion and the second wiring portion are disposed in the frame area.

3. The electronic device according to claim 2, further comprising:
a middle frame,
wherein the light-transmitting cover plate is disposed on the middle frame,
wherein the middle frame is provided with a groove, along a circumferential direction of the light-transmitting cover plate,
wherein at least part of the frame area protrudes from the light-transmitting cover plate, and
wherein the frame area is disposed in the groove.

4. The electronic device according to claim 2, wherein at least part of the electrochromic assembly is of a flexible structure, and
wherein along a circumferential direction of the light-transmitting cover plate, at least part of the frame area is bent and arranged on a side of the color-changing area facing away from the light-transmitting cover plate, so that the light-transmitting cover plate covers the color-changing area.

5. The electronic device according to claim 2, wherein the conductive area comprises:
   a first conductive layer, connected to the light-transmitting cover plate, wherein the first conductive layer comprises: the antenna area, the conductive area, and the isolation area; and
   a second conductive layer, disposed opposite the first conductive layer, wherein the electrochromic layer is disposed between the first conductive layer and the second conductive layer.

6. The electronic device according to claim 5, wherein the second wiring portion comprises:
   a first conductive wire, connected to the conductive area, wherein the first conductive wire is disposed in the frame area; and
   a second conductive wire, connected to the second conductive layer, wherein the second conductive wire is disposed in the frame area.

7. The electronic device according to claim 5, wherein the electrochromic assembly further comprises:
   a first substrate, wherein the first substrate is connected to the light-transmitting cover plate, and the first substrate is located between the light-transmitting cover plate and the first conductive layer; and
   a second substrate, wherein the second substrate is connected to the second conductive layer and is located on a side of the second conductive layer facing away from the first conductive layer.

8. The electronic device according to claim 7, wherein the electrochromic assembly further comprises:
   an adhesive member, wherein the first substrate is connected to the light-transmitting cover plate by using the adhesive member.

9. The electronic device according to claim 8, wherein the first substrate comprises any one of a resin substrate and a glass substrate,
   wherein the second substrate comprises any one of a resin substrate and a glass substrate, and
   wherein the adhesive member comprises an optically clear adhesive.

10. The electronic device according to claim 5, further comprising:
    a circuit board, wherein the circuit board is bent and arranged on a side of the first conductive layer facing away from the light-transmitting cover plate, an end of the circuit board is connected to the first wiring portion, and another end of the circuit board is connected to the mainboard.

11. The electronic device according to claim 1, wherein the electrochromic layer comprises:
    an electrochromic material layer, wherein the electrochromic material layer is disposed close to the light-transmitting cover plate;
    an ion storage layer, wherein the ion storage layer is located on a side of the electrochromic material layer facing away from the light-transmitting cover plate; and
    an electrolyte layer, wherein the electrolyte layer is located between the electrochromic material layer and the ion storage layer.

12. A housing assembly, performed by an electronic device, comprising:
    a light-transmitting cover plate; and
    an electrochromic assembly, disposed on the light-transmitting cover plate,
    wherein the electrochromic assembly comprises: a conductive layer and an electrochromic layer connected to the conductive layer,
    wherein the conductive layer is connected to the light-transmitting cover plate,
    wherein the conductive layer comprises: an antenna area and a conductive area,
    wherein the antenna area and the conductive area are connected to each other through an isolation area, and the isolation area surrounds the antenna area,
    wherein the antenna area is connected to a mainboard of the electronic device and serves as a communication antenna of the electronic device, and
    wherein the electrochromic layer is connected to a power supply through the conductive area and changed in color when the electrochromic layer is powered on.

* * * * *